C. C. Converse,
Fruit Basket,
N° 44,400.   Patented Sept. 27, 1864.

Witnesses
Jas. P. Hall.
C. L. Topliff

Inventor
Charles Crozat Converse

UNITED STATES PATENT OFFICE.

CHARLES CROZAT CONVERSE, OF DUBUQUE, IOWA.

FRUIT-BASKET.

Specification forming part of Letters Patent No. 44,400, dated September 27, 1864.

*To all whom it may concern:*

Be it known that I, CHARLES CROZAT CONVERSE, of Dubuque, in the county of Dubuque and State of Iowa, have invented a new and useful Improvement in Fruit-Baskets; and I do hereby declare that the following is a full, clear, and exact description thereof, which will enable others skilled in the art to make and use the same, reference being had to the accompanying drawings, forming part of this specification, in which—

Figure 1:
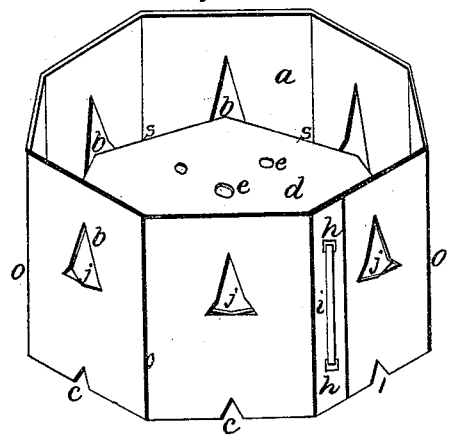
Figure 2:
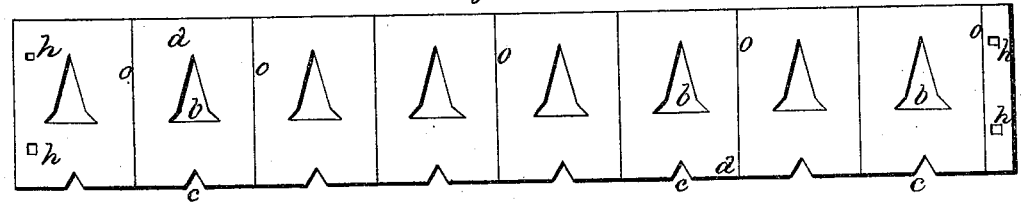
Figure 3:
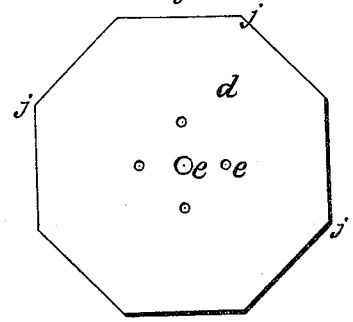

Figure 1 represents a perspective view of a basket constructed after my improvement. Fig. 2 is a plan of its sides laid out. Fig. 3 is a detached view of its bottom.

Similar letters of reference indicate like parts.

Fruit-growers are compelled now to invest a large amount of capital in providing suitable means for transporting fruit and berries in good condition on account of the great cost of the boxes and baskets and crates in which they are transported. This cost is so great and the amount of capital thus invested is so large that it is the common custom for the commission-merchants and middlemen to return the boxes and baskets to the growers after they have been emptied, so that they may be used again, and this custom continues the entire season, involving a great loss of time and much trouble and expense in handling, packing, and transporting these boxes and baskets, and thereby reducing the profit of the fruit-grower and increasing the price of the fruit and berries. This custom entails so much trouble upon the commission-merchants that it is their practice to sell fruit for those growers who do not require the return of the boxes and baskets for a commission of five per cent., while they charge ten per cent. to those who require them to be returned. My fruit-basket can be furnished so cheap as to save this trouble and expense to the grower and the seller, and provide the buyer with a neat, cleanly, and convenient means for carrying the fruit and berries home. The sides of my box are composed of one piece of wood or of any other material which has the necessary stiffness.

I have shown in the drawings one manner of carrying out my invention, *a* representing the sides, and *d* the bottom, of a box for holding fruit and berries. The sides *a*, if made of wood, may be very thin and of the general form when laid out as shown in Fig. 2. I next cut out the openings *b* of conical or other shape, widening their bases as seen in the figure, and also the small holes *h* and the angular notches *c* on the lower edge. These holes and openings may be made by means of a punch with knives, repeated as often as there are to be openings and holes in the blank to be cut. The same punch should be provided with projecting beads or very minute cutting-lines, so as when the openings are cut in the blank the lines *o* shall be marked or indented on the blank. These lines, on account of the thinness of the material I propose to use, should be very slightly cut or indented, so as not to penetrate through the material or cause the fracture of the grain of the material when the blank is bent to extend through it.

The bottom *d* may be of the same material and thickness as the sides *a*, and may be cut out by a punch, which shall form its sides and perforate it with more or less holes, *e*, at the same blow. Many blanks both of the sides and bottoms may be cut and prepared under the same blow of the punch. The angles *j* of the bottom must be as numerous as the openings *b* of the sides. The box accordingly may be of any number of sides to suit the kind of fruit to be sent in it, or the fancy of the manufacturer. The holes *h* at the ends are to receive fastenings, which in this example are represented to be a strip of tin whose ends are turned in and bent over in the holes *h*. Any other form of fastening may be used, such as thread or wire, or the ends may be tacked, or the ends of the blank *a* may be cut so as to interlock and thus form a fastening, or they may be glued together. The parts *a* and *d* having been properly prepared, the angles *j* of the bottom are to be presented against the openings *b*, and the side piece is to be brought up and bent around the bottom piece until all the angles *j* are fitted in and project through the openings *b*, so that the edges of the angles *j* shall be held by the sides of the openings, and the bottoms of the angles rest upon the bases of the openings. The ends of the side piece are then to be brought together and secured, when the box is complete. The openings *c* in the lower edge of the sides of the box may be of larger size than those shown, if desired, their object being to secure a more perfect ventilation. When the side piece is bent around the bottom piece, the grain of the material will yield and part on the lines o sufficiently to form complete angles, and yet not enough to destroy the integrity of the joint. The straight sides of the bottom will form angles s with adjacent sides of the piece a between each opening b, and thereby aid in ventilating the contents of the box. The openings b serve also for ventilation. The side and bottom pieces may be prepared by the manufacturer and shipped to the fruit-grower in the most distant parts of the country without setting them up, and so he may be able to pack a vast number in a small compass.

A box constructed upon this principle will not be likely to get upset, as its base is as broad as its greatest diameter, and it will be found to possess much strength and unusual lightness.

If it is desired, the box may be made circular without the lines or cuts o.

I claim as new and desire to secure by Letters Patent—

1. The box constructed, substantially as above described, by supporting its bottom upon its own sides, as above set forth.

2. The method thus described of securing the bottom of the box in its proper place by inserting the angular corners of the same or the spurs formed on the edge of a round or otherwise shaped bottom into slots or perforations made in the sides of the box to receive them, the upper portion of said slots or perforations at the same time securing the additional purpose of ventilation, and any other device substantially the same and producing analogous results.

CHARLES CROZAT CONVERSE.

Witnesses:
JAMES P. HALL,
WM. F. MCNAMARA.